(12) United States Patent
Gagnon (10) Patent No.: US 8,466,419 B2
(45) Date of Patent: Jun. 18, 2013

(54) SYSTEM AND METHOD FOR ENHANCED SAMPLING VIA HELICAL SCANNING AND LIST-MODE RECONSTRUCTION IN POSITRON EMISSION TOMOGRAPHY

(75) Inventor: Daniel Gagnon, Twinsburg, OH (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 250 days.

(21) Appl. No.: 12/571,524

(22) Filed: Oct. 1, 2009

(65) Prior Publication Data

US 2011/0079722 A1    Apr. 7, 2011

(51) Int. Cl.
*G01T 1/164* (2006.01)

(52) U.S. Cl.
USPC .................................... 250/363.06

(58) Field of Classification Search
USPC .................................... 250/363.03
See application file for complete search history.

(56) References Cited

U.S. PATENT DOCUMENTS

| 6,628,983 | B1 * | 9/2003 | Gagnon .............. 600/431 |
| 2006/0284095 | A1 * | 12/2006 | Muehllehner et al. ... 250/363.02 |
| 2007/0090300 | A1 * | 4/2007 | Sibomana et al. ....... 250/370.09 |
| 2010/0074498 | A1 * | 3/2010 | Breeding et al. ........... 382/131 |

OTHER PUBLICATIONS

M.-A. Tetrault, et al., Real Time Coincidence detection Engine for High Count Rate Timestamp Based PET, IEEE Transactions on Nuclear Science, vol. 57. No. 1, Feb. 2010, p. 117-124.
Sachin S. Junnarkar, et al., FPGA based self calibrating 40 picosecond resolution, wide range Time to Digital Converter, No. of pp. (6).
Chinese Office Action issued on Feb. 28, 2012 in corresponding Chinese Application No. 201010290428.6 (with an English Translation).
Zhao Jun, "PET/CT Scanner-Fusion of Anatomic and Functional Images in a Single Device", Foreign Medical Sciences: Section of Radiation Medicine and Nuclear Medicine, 2000, vol. 24, No. 6, pp. 246-248.
Chinese Office Action mailed Nov. 27, 2012 issued in Chinese Patent Application No. 201010290428.6.
Imrek, J., "Development of an FPGA-Based Data Acquisition Module for Small Animal PET", IEEE Transactions on Nuclear Science, vol. 53, No. 5, Oct. 2006. pp. 2698-2703.

* cited by examiner

*Primary Examiner* — Christine Sung
(74) *Attorney, Agent, or Firm* — Oblon, Spivak, McClelland, Maier & Neustadt, L.L.P.

(57) ABSTRACT

A positron emission tomography (PET) scanner system, including a detector that acquires PET event information, the detector being configured to move during acquisition of the PET event information; a first motion unit that acquires first event information of a position of a patient bed, the patient bed being configured to move during acquisition of the PET event information; a second motion unit that acquires second event information of the detector; an event collector that generates an event list of events that includes the PET event information, the first event information, and the second event information; and a list-mode reconstructing unit that reconstructs an image by processing the generated event list.

17 Claims, 9 Drawing Sheets

Single Event – data format (one entry in the list for each event)

| Energy [9-bits] | Crystal Position [18-bits] | Fine Time Stamp [20-bits] | Entry Type |
|---|---|---|---|

Coarse Time Stamp – data format (one entry in the list every 25.6uS)

| Coarse Time Stamp [32-bits] | Entry Type |
|---|---|

Global Time Stamp – can be compiled from the list for each event
(supports up to 30 hours scan)

| Coarse Time Stamp [32-bits] | Fine Time Stamp [20-bits] |
|---|---|

SYSTEM AND METHOD FOR ENHANCED SAMPLING VIA HELICAL SCANNING AND LIST-MODE RECONSTRUCTION IN POSITRON EMISSION TOMOGRAPHY

BACKGROUND OF THE INVENTION

1. Field of the Invention

This application is generally directed to a positron emission tomography (PET) scanner system that reconstructs an image based on acquired PET information, acquired position information of a patient bed, and acquired position of a detector system.

2. Discussion of the Background

The use of positron emission tomography (PET) is growing in the field of medical imaging. In PET imaging, a radiopharmaceutical agent is introduced into the object to be imaged via injection, inhalation, or ingestion. After administration of the radiopharmaceutical, the physical and bio-molecular properties of the agent will cause it to concentrate at specific locations in the human body. The actual spatial distribution of the agent, the intensity of the region of accumulation of the agent, and the kinetics of the process from administration to eventually elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time, an annihilation event produces two gamma rays at 511 keV traveling at substantially 180 degrees apart.

By detecting the two gamma rays, and drawing a line between their locations, i.e., the line-of-response (LOR), one can retrieve the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (e.g., energy of the positron) will also contribute (via positron range and co-linearity of the two gamma rays) to the determination of the spatial resolution the specific agent.

The collection of a large number of events creates the necessary information for an image of an object to be estimated through tomographic reconstruction. Two detected events occurring at substantially the same time at corresponding detector elements form a line-of-response that can be histogrammed according to their geometric attributes to define projections, or sinograms to be reconstructed. Events can also be added to the image individually.

The fundamental element of the data collection and image reconstruction is therefore the LOR, which is the line traversing the system-patient aperture. Additional information can be obtained regarding the location of the event. First, it is known that, through sampling and reconstruction, the ability of the system to reconstruct or position a point is not space-invariant across the field of view, but is better in the center, slowly degrading toward the periphery. A point-spread-function (PSF) is typically used to characterize this behavior. Tools have been developed to incorporate the PSF into the reconstruction process. Second, the time-of-flight, or time differential between the arrival of the gamma ray on each detector involved in the detection of the pair, can be used to determine where along the LOR the event is more likely to have occurred.

The above described detection process must be repeated for a large number of annihilation events. While each imaging case must be analyzed to determine how many counts (i.e., paired events) are required to support the imaging task, current practice dictates that a typical 100-cm long, FDG (fluorodeoxyglucose) study will need to accumulate several hundred million counts. The time required to accumulate this number of counts is determined by the injected dose of the agent and the sensitivity and counting capacity of the scanner.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. The use of partial rings and rotation of the detector to capture missing angles is also possible, but these approaches have severe consequences for the overall sensitivity of the scanner. In a cylindrical geometry, in which all gamma rays included in a plane have a chance to interact with the detector, an increase in the axial dimension has a very beneficial effect on the sensitivity or ability to capture the radiation. Thus, the best design is that of a sphere, in which all gamma rays have the opportunity to be detected. Of course, for application to humans, the spherical design would have to be very large and thus very expensive. Accordingly, a cylindrical geometry, with the axial extent of the detector being a variable, is realistically the starting point of the design of a modern PET scanner.

PET scanners have progressively increased the quality (density) of sampling by putting smaller and smaller crystals as elements in the PET detector ring. PET scanners have become more and more three-dimensional by adding more and more rings to the PET detector system. PET detector crystals are already one the most expensive portions of the PET scanner. Small animal scanners are pushing the limit of how small the scintillation crystals can be. While typical, human-sized clinical systems are built around 4-6 mm square or rectangular crystals, some small-animal systems are using effectively a sub-millimeter crystal size. However, the increased cost to prepare and characterize each crystals, and the complexity (smaller crystals also means more channels and more accurate reconstruction requirements), has put a heavy burden on the use of smaller crystals in clinical systems.

Another way to improve the spatial resolution of the acquired PET data is to perform sub-sampling. In this approach, a data set is acquired with the "native" geometry of the scanner, a second data set is then acquired with the geometry slightly changed. If the knowledge of the small change in geometry is more accurate than the native spatial resolution of the system, sub-sampling is then obtained with improvement in the overall system resolution. This approach with two samples can be repeated with more elements, but is limited to "single-ray" image reconstruction, such as filtered back-projection or Fourier rebinning, since modern statistical reconstruction methods (e.g., maximum-likelihood, expectation maximization (ML-EM)) do not benefit from such sampling as they already model the finite size of the sampling element.

Historically, two types of sub-sampling have been implemented for single-ray reconstruction systems. In one approach, a motion is imposed on the entire scanner in the transaxial plane (wobble), allowing for a smaller-than-crystal size resolution in the transaxial reconstruction. A second technique, very similar to what is also available in SPECT imaging, requires continuously moving the patient bed. In this approach, sub-crystal resolution can be obtained in the axial direction.

Figure 1A:
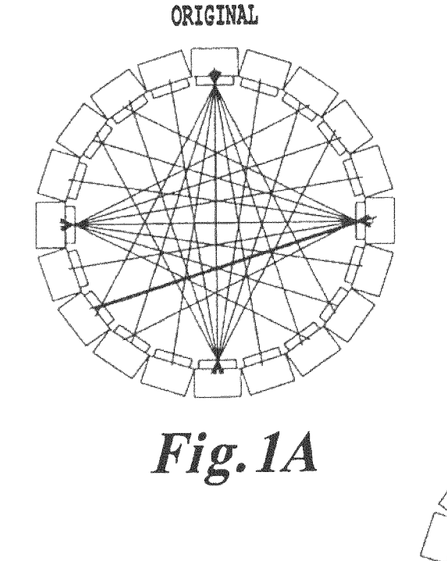
FIGS. 1A-1C illustrate a process of sampling in the transaxial plane, including an original sampling pattern, a pattern obtained by a pure rotation about the main axis, and a pattern obtained by an up-down translation in the transaxial plane.
Figure 1B:
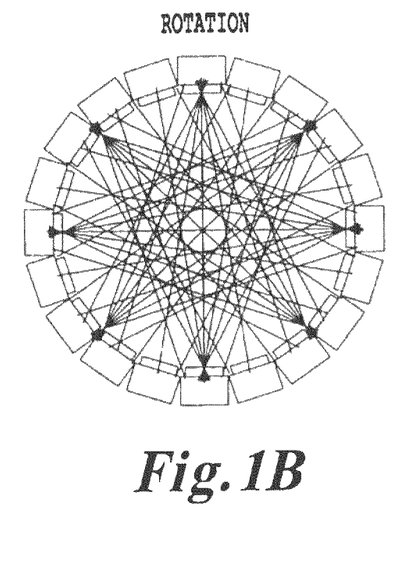
Figure 1C:
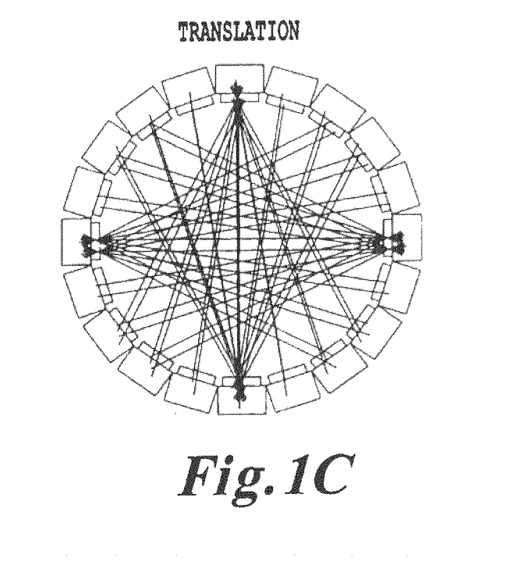
Figure 2A:
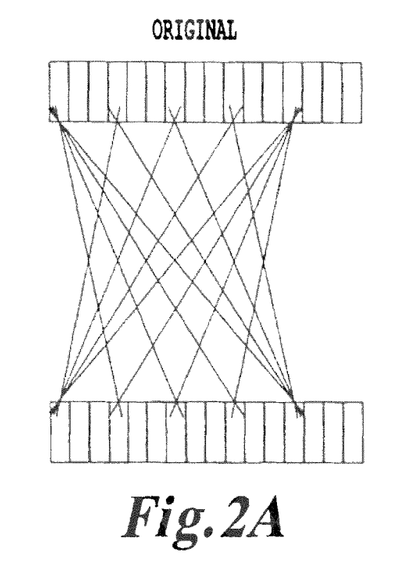
FIGS. 2A and 2B illustrate an original sampling pattern in the axial plane, and a pattern obtained by a simple lateral translation in the axial direction.
Figure 2B:
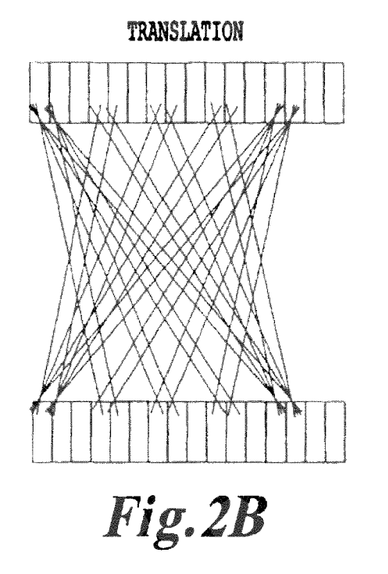

As shown in FIGS. 1A-1C, simple rotation and translation can drastically increase the density of sampling (line of response) from the same detection. FIGS. 1A-1C show sampling in the transaxial plane, including an original sampling pattern (FIG. 1A), a pattern obtained by a pure rotation about the main axis (FIG. 1B), and a pattern obtained by an up-down translation in the transaxial plane (FIG. 1C). FIGS. 2A and 2B show an original sampling pattern in the axial plane, and a pattern obtained by a simple lateral translation in the axial direction.

SUMMARY OF THE INVENTION

An exemplary embodiment of the present invention is directed to a positron emission tomography (PET) scanner system, comprising: (1) a detector to acquire PET event information, the detector being configured to move during acquisition of the PET event information; (2) a first motion unit configured to acquire first event information of a position of a patient bed, the patient bed being configured to move during acquisition of the PET event information; (3) a second motion unit configured to acquire second event information of the detector; (4) an event collector configured to generate an event list of events that includes the PET event information, the first event information, and the second event information; and (5) a list-mode reconstructing unit configured to reconstruct an image by processing the generated event.

Accordingly to one aspect of the present invention, the event collector is configured to generate a time stamp for each of the events in the event list and to generate the event list in chronological order of the events based on the time stamps list.

According to another aspect of this invention, the detector is configured to acquire the PET information in list mode, the list mode including time-of-flight information.

According to another aspect of this invention, the patient bed is configured to move linearly.

According to another aspect of this invention, the patient bed is configured to move following a arbitrary trajectory.

According to another aspect of this invention, the detector is configured to rotate around the isocenter of the PET scanner.

According to another aspect of this invention, the detector is configured to rotate around an arbitrary point of the PET scanner.

According to another aspect of this invention, the detector is configured to translate along a curve in a transaxial plane of the PET scanner.

According to another aspect of this invention, the detector remains stationary during acquisition of the PET information, and a motion of the patient bed is a curve in three-dimensional space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Exemplary embodiments of the present invention relate to a component of a PET imaging system defining how the radioactive field or object will be sampled. While the detector can only acquire single events, PET information is obtained by pairing two single events with the proper energy and timing characteristics. The quality of the final information (image) will depends on the quality of the timing and energy discrimination and the density of the Line-of-Response (LOR), or the line connecting two crystals in a coincidence event. The spatial resolution is the result of both the accuracy of this sampling and the details of the mathematical reconstruction.

Figure 9:
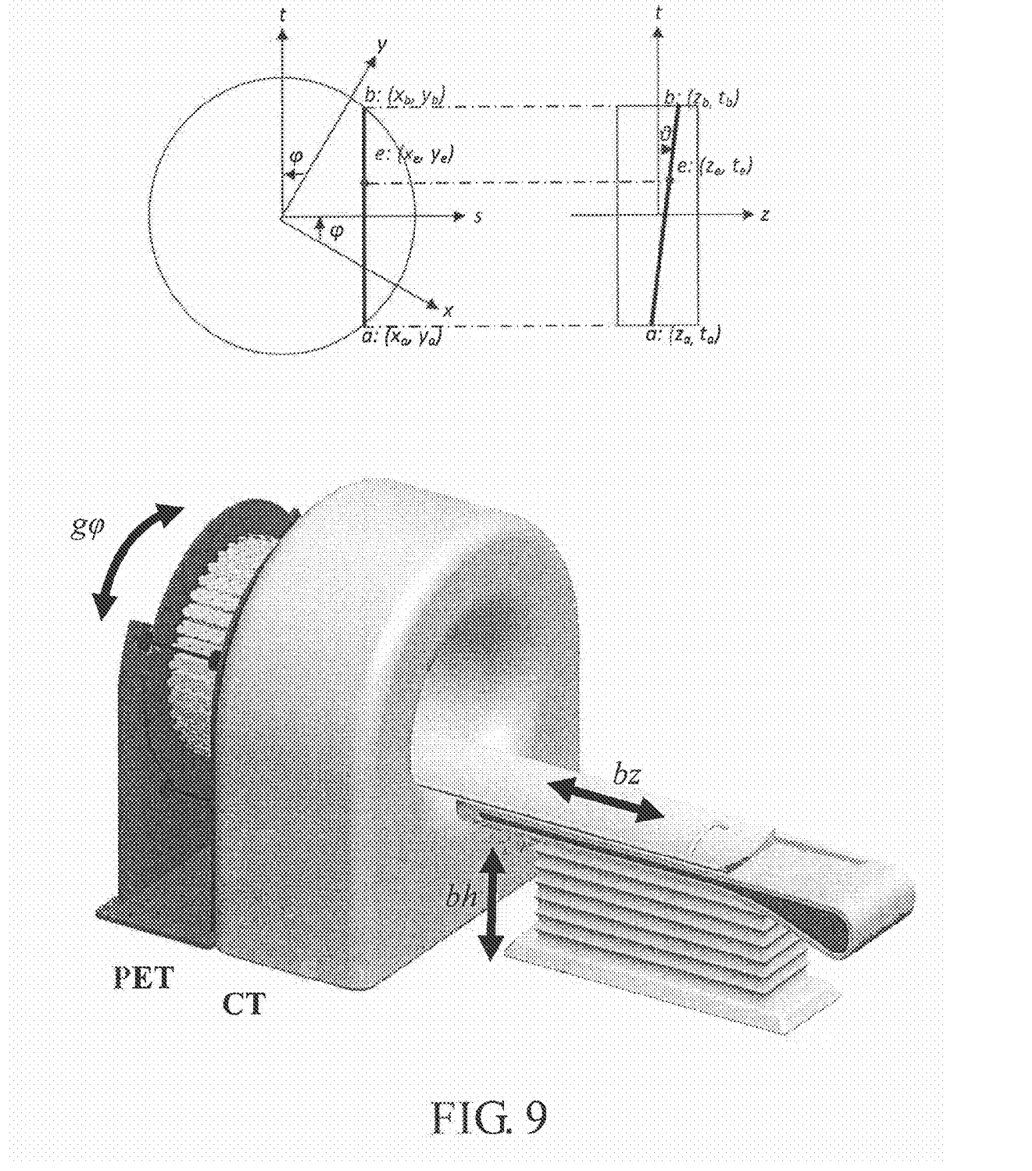
FIG. 9 is a diagram illustrating a PET/CT scanner and associated coordinate system.

According to an embodiment of the present invention, a method to improve the quality of the sampling while decreasing the overall cost of the PET scanner is to create detector modules with the proper characteristics to support the desired spatial resolution and to sparsely dispose them, both axially and circumferentially, on the detector ring, and to use motion of the gantry and/or bed to fill the sampling gaps left by not having a fully populated ring. See FIG. 9, which illustrates a patient bed and a detector ring for a PET/CT scanner system. While this approach reduces the sensitivity (e.g, having one-half the coverage of the scanner reduces by a factor of four the probability of detecting coincidences), it clearly achieves the desired spatial resolution without any compromises with respect to the expense of imaging time.

Figure 4A:
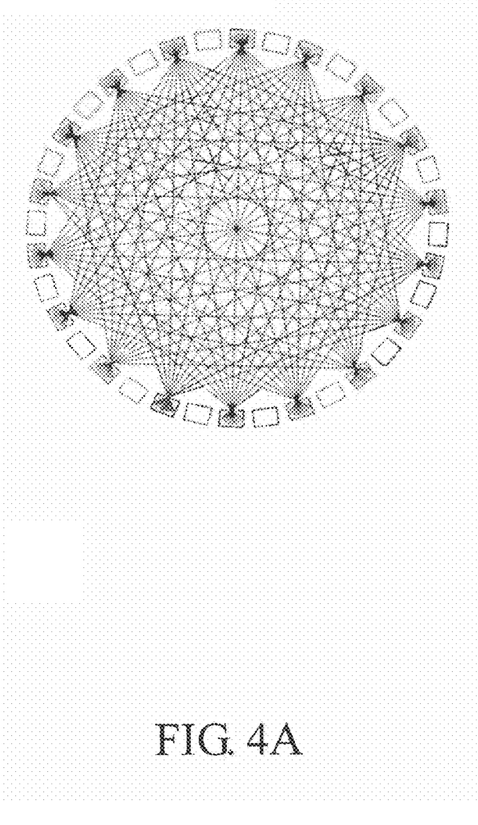
FIGS. 4A and 4B illustrate a detector ring that includes only one-half of the possible detector modules in the ring.
Figure 4B:
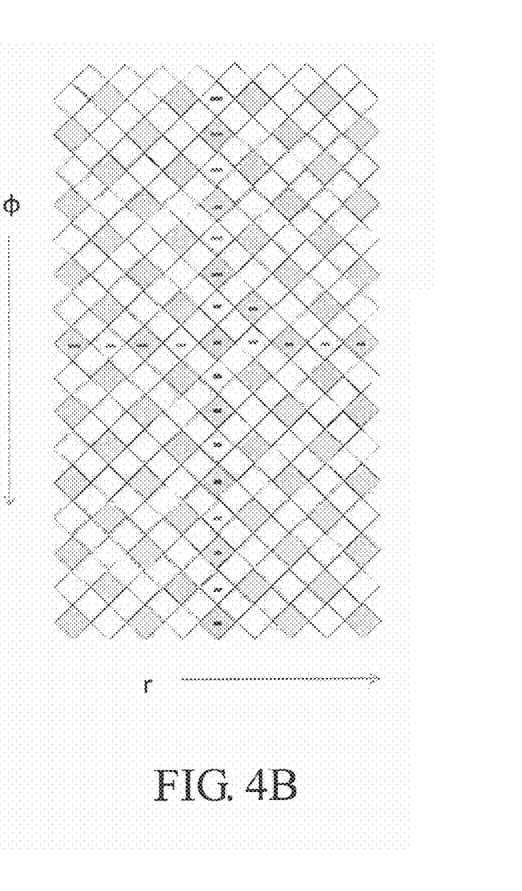

A non-fully-populated detector ring is shown in FIG. 4A, which shows a detector ring with only one-half of the detector components in place. While the number and distribution of the possible LORs appears reasonable, a Radon-space $(r, \phi)$ representation (FIG. 4B) clearly shows large numbers of gaps in the sampling space and illustrates that only ¼ of the "cells" are filled. Rotation of the whole detector system causes the graph to move up or down progressively "filling" in the missing cells. Motion of the bed up-down, which is typically easier to achieve than left-right, for example, causes a complex deformation of this graph, where a full one-to-one lateral shift is obtained at the angle corresponding to the axis of the motion, and composed with a $\cos(\phi)$ elsewhere. Combinations of rotation and translation have a combined effect (and efficiency) on filling the missing cells. It should be understood, however, that arbitrary movement of the detector ring and/or patient bed will reduce the useable field-of-view as all the movement must happen within the scanner aperture itself.

Gaps in the axial direction, with the total z-coverage being accomplished by two half-detectors having a gap between them adds more LORs.

In this sub-sampling approach, each new variable obtained by acquisition has to be explicitly recognized by reconstruction. In a histogram mode reconstruction, the sinogram is already a 4-dimensional entity (r, φ, z, θ), wherein t is the radial distance, φ is the angle inside the ring, z is the distance in the axial dimension, and θ is the oblique angle, i.e., tilt from the transaxial plane, to include all possible LORs in direct and oblique sinograms. The complexity of such an approach is great, considering that other variables are also necessary, including dynamic information d (of dimension of one to a few dozen) and/or gated information g (of dimension of 8 to 16), and time-of-flight tof (of dimension of at least 8 to 16). With these requirements, adding axial bed motion bz (of dimension 2 to 8) and gantry motion gφ (of dimension 2 to 8) creates a nine dimensional data structure (r, φ, z, θ, d, g, tof, bz, gφ). With the possible exception of d and g that may not occur at the same time, all other variables are necessary for several typical clinical procedures. Thus, conventional systems usually use either one or only a limited number of the additional variables and do not typically support additional sampling. In additional to the increase dimensionality of the data sets, the total number of counts would not increase so that the 8- or 9-dimensional data set is typically very sparse and contains a very high occurrence of empty voxels or voxels with only one count.

In 'list-mode" reconstruction, each event is attached with all the necessary (possibly nine or more) variables and individually incorporated into the reconstruction process. In this approach, adding more information on each event has only a marginal impact on reconstruction complexity and overall reconstruction time. Additionally, since individual events are considered directly by reconstruction, there is no need to have fixed increments for any of the variables, and continuous movement of any of the axes can be implemented, as long as the monitoring of those movements is fast and accurate.

Exemplary embodiments of the present invention are directed to a system and method that include information of the position of the object (patient) to be imaged, including the axial (bz) and transaxial (gφ) data, in the reconstruction process.

Exemplary embodiments of the present invention describes a system where axial and transaxial enhancement of sampling and resolution are available at the same time via continuous bed motion and overall movement of the PET detector, in which all the spatial information is attached to each individual event and directly reconstructed without the need to create histograms of any kind.

Figure 3:
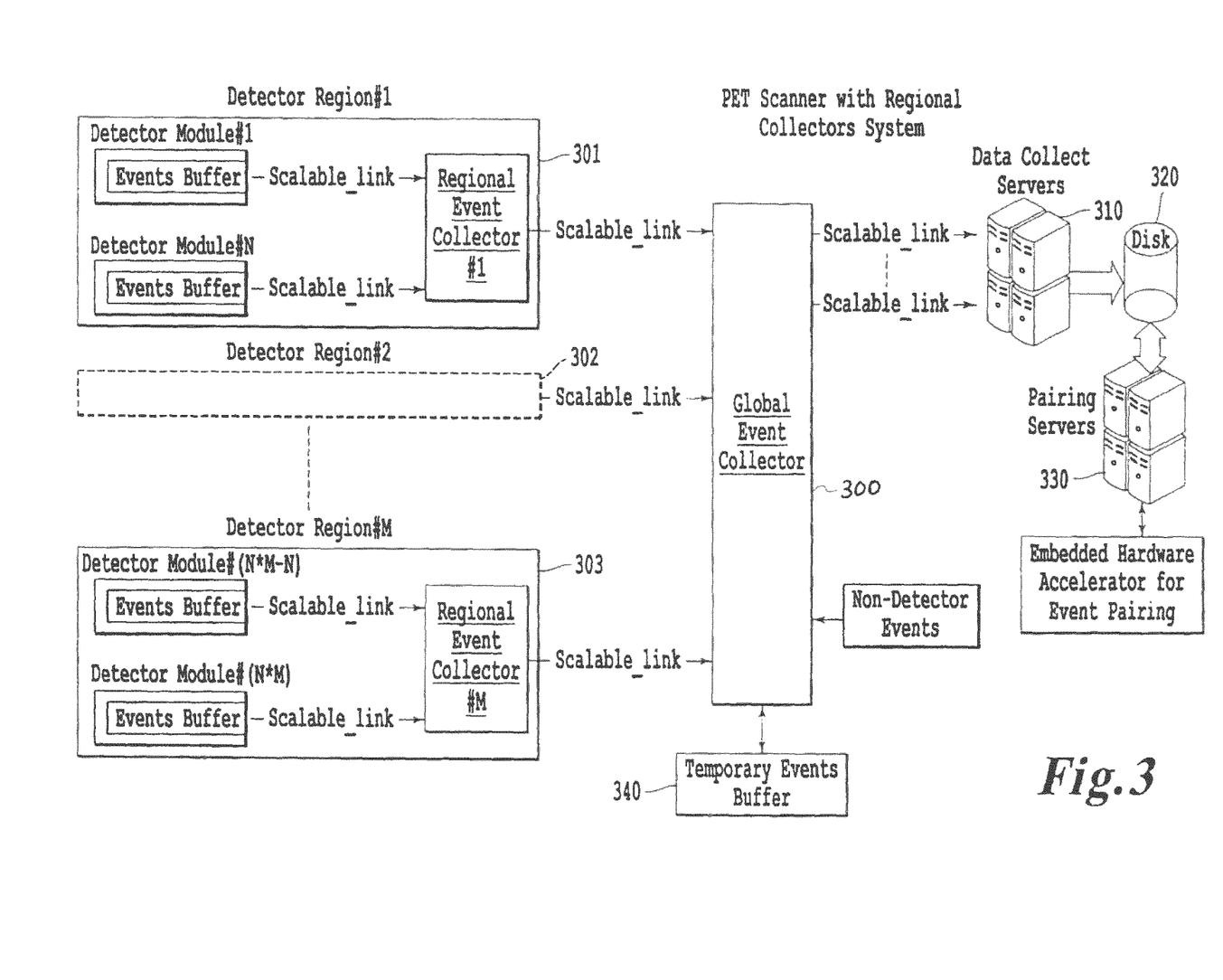
FIG. 3 illustrates a system according to an embodiment of the present invention.

An element in the implementation of embodiments of this invention is the merger of the detector information (events with their timing, energy, and spatial information), and the non-detector information (bed position, gantry rotation, and other standard laboratory timing reference). FIG. 3, which is discussed in more detail below, illustrates a system in which a global event collector 300 is connected to each sub or regional collector 301-303, and to the circuitry controlling/monitoring the non-detector information.

The motion of the bed is reasonably simple and a uniform and typically linear. Gantry motion offers more choices, from pure rotation around the main axis, rotation around any other points, translation along a line in the transaxial plane, or any combinations of those elementary movements. An alternate embodiment uses the linear and up/down motion of the bed (already in place) to accomplish the same level of sub-sampling is the transaxial and axial planes.

In FIG. 3, the global event collector 300 receives event information from regional collector 301, which include N detector modules connected to a regional event collector. The regional collectors have a similar architecture. As shown in FIG. 3, the global event collector 300 also receives non-detector events, which includes information regarding the bed position, gantry rotation, and other standard laboratory timing reference information. See FIG. 8. The global event collector associates in time the detector information received by the regional collectors 301-303 with the corresponding non-detector event information, such as the bed and gantry positions.

As shown in FIG. 3, the information collected by the global event collector is sent to data collect servers 310 for storage in an associated database/disk storage 320. Event pairing is performed by pairing servers 330, which access the information stored in the database 320. Alternatively, the data collect servers 310 and the pairing servers can be implemented by the same machine.

Figure 5:
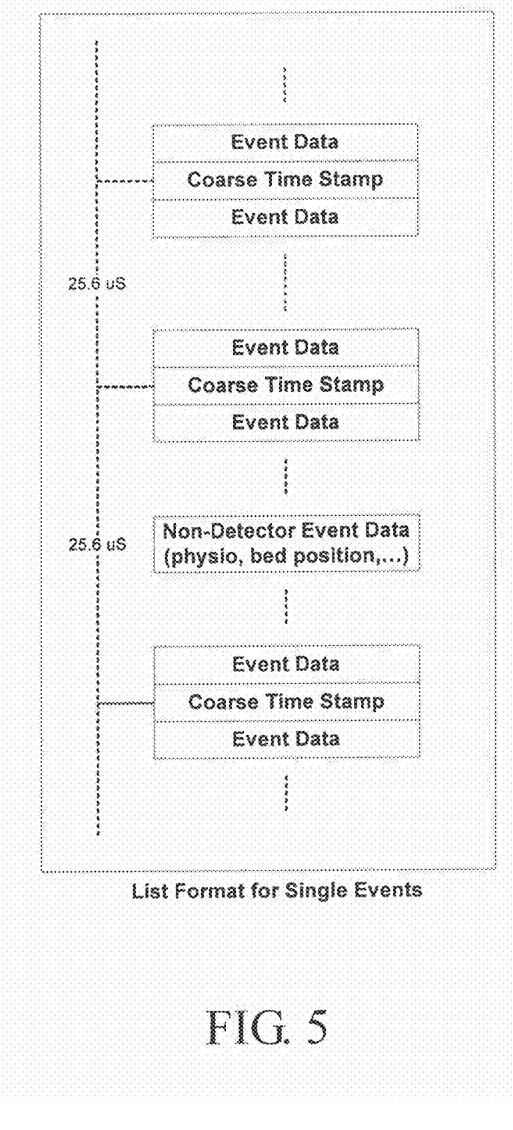
FIG. 5 illustrates a list format for single events.

The global event collector 300 combines event data from all detectors into a single list. The format of the event list is described in more detail below with respect to FIGS. 56 and 6.

The global event collector also incorporates non-detector events into the event list, such as those events related to the motion/position of the patient bed and the detector ring, and physiological information such as EKG information. The non-detector events occur on a different time scale and describe, e.g., the position of the patient bed as a function of time, the angular position on the PET detector ring as a function of time, an EKG signal, a respiratory signal trace, and any other physiological or transducer signal necessary to perform the final reconstruction and presentation of the PET event data.

In creating the event list, the global event collector 300 must reorder the events to arrange the events in chronological order. Further, the global event collector 300 must buffer temporary event bursts into a temporary events buffer for later processing. In the case of a buffer overflow condition, the global event collector will randomly discard received events.

Another function that can be performed by the global event collector is in-line event filtering to discard events from the event list with data information (e.g., energy) outside of a window of interest. The window of interest or other filtering criteria is programmable.

As shown in FIG. 3, the global event collector 300 distributes the event list with the event data to data collect servers 310 for eventual processing by the pairing servers 330. In one embodiment, data is periodically transferred to the pairing servers when either a given amount of time or number of events is reached. Data transfer to the pairing servers is performed by periodically packing portions of the event list, which are compiled in the temporary buffer of the global event collector, into messages and transmitting them to the servers. For optimal data transfer, the size and rate of the messages are functions of the event count rate. At higher count rates, the messages become larger, thus the overhead associated with each message becomes negligible. At lower count rates, the message overhead is much less important, because of the abundance of available bandwidth, hence smaller messages are sent more often to allow the servers to continuously process smaller portions of the data, instead of burst processing of large portions of data and then pausing for long periods.

FIG. 5 illustrates a format of the above-mentioned event list used in an exemplary embodiment of the present invention. As shown in FIG. 5, the event list contains a sequence of entries. Each entry contains an "Entry Type" field to indicate the type of data included in the entry. For single events, at least three different entry types are used: (1) event data; (2) coarse time stamp data; and (3) non-detector event data, such as physiological data, bed position, detector position, EKG data, etc. As shown in FIG. 5, in one embodiment, a coarse time stamp event occurs every 25.6 microseconds. Non-detector events will typically occur much less frequently than the event data of coarse time stamp events.

Figure 6:
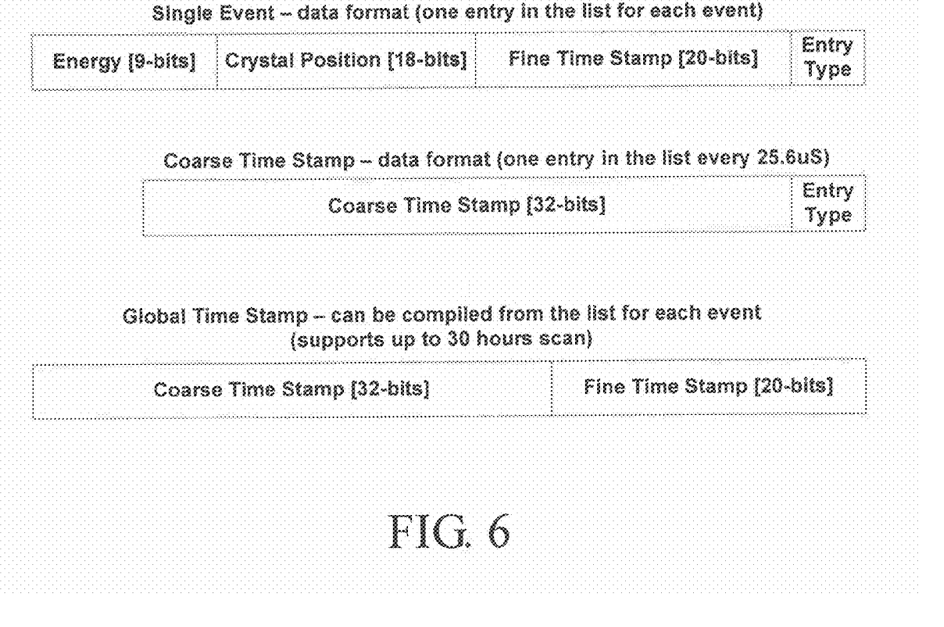
FIG. 6 illustrates a format of a single event, coarse time stamp, and global time stamp.

As shown in FIG. 6, in one embodiment, a format of an event data entry includes four fields: (1) a 9-bit energy field; (2) an 18-bit crystal position field; (3) a 20-bit fine stamp; and (4) an entry type field. The energy field specifies the energy of the detected event, while the crystal position field identifies the crystal location of the event. In one embodiment, the fine time stamp has a resolution of 24.4 ps, and thus a range of 25.6 μs.

As shown in FIG. 6, in one embodiment, the coarse time stamp field includes: (1) a 32-bit coarse time field, and (2) an entry type field. The resolution of the coarse time stamp field is equal to the range of the fine time stamp field, i.e., in one embodiment 25.6 μs. Accordingly, since 32 bits are allocated to the coarse time stamp field, the range is approximately 30 hours in this embodiment.

Field types and the allocations of bits to each field, other than those described above, can also be used.

FIG. 6 also illustrates a global time stamp that can be derived from each event in the list by concatenating the coarse time stamp and the fine time stamp to provide a resolution of 24.4 ps and a range of approximately 30 hours.

As described above, the global event collector is primarily responsible for generating the event list shown in FIG. 5 and transmitting the event data to the data collect servers and the pairing servers for processing (i.e., event pairing and reconstruction). However, depending on the availability of resources, which depends on event count rates, the global event collector can also perform data processing tasks including filtering, event pairing, and reconstruction.

In one embodiment, the global event collector 300 is implemented in programmable logic, which allows it to be reconfigured to perform different functions on the fly. For example, during a PET scan, the initial count rates are typically very high and most of the logic resources of the global event collector will be utilized to transfer the event data in the event list to the data collect servers. As the scan continues, the count rates will decrease, which will allow some of the logic of the global event collector to be freed up for data processing. As count rates continue to further decrease, more and more of the logic resources of the global event collector can be dedicated to data processing, assisting the efforts of the pairing server.

Thus, the global event collector constantly monitors count rates and decides whether to perform data processing, thus fully utilizing the system's resources, which results in a cost-effective system and faster image processing. The count rate is continuously being monitored by each detector module, but all detector modules provide this information to the global event collector and the global event collector computes the real time count rate for the entire PET scanner. Based on the count rate for the entire scanner, the global event collector decides what kind and amount of data processing it can perform, in addition to data acquisition, at any given time. Thus, it is possible to adjust how the different computing resources are allocated dynamically, according to the instantaneous count rate within a study. For example, in an $^{86}$Rb study, an extreme count rate lasts for the first minute or two and then progressives into a medium or low count rate.

In the context of this invention, the term "off-line" refers to a system that can process events at a time significantly different than the time during which they were detected. In a practical implementation, it is of course desirable to initiate the pairing operation as quickly as possible after detection so as to obtain an image in an acceptable period of time. In an alternate implementation, the detection and pairing occurs at the same time (on different events) in a pipeline mode.

Figure 7:
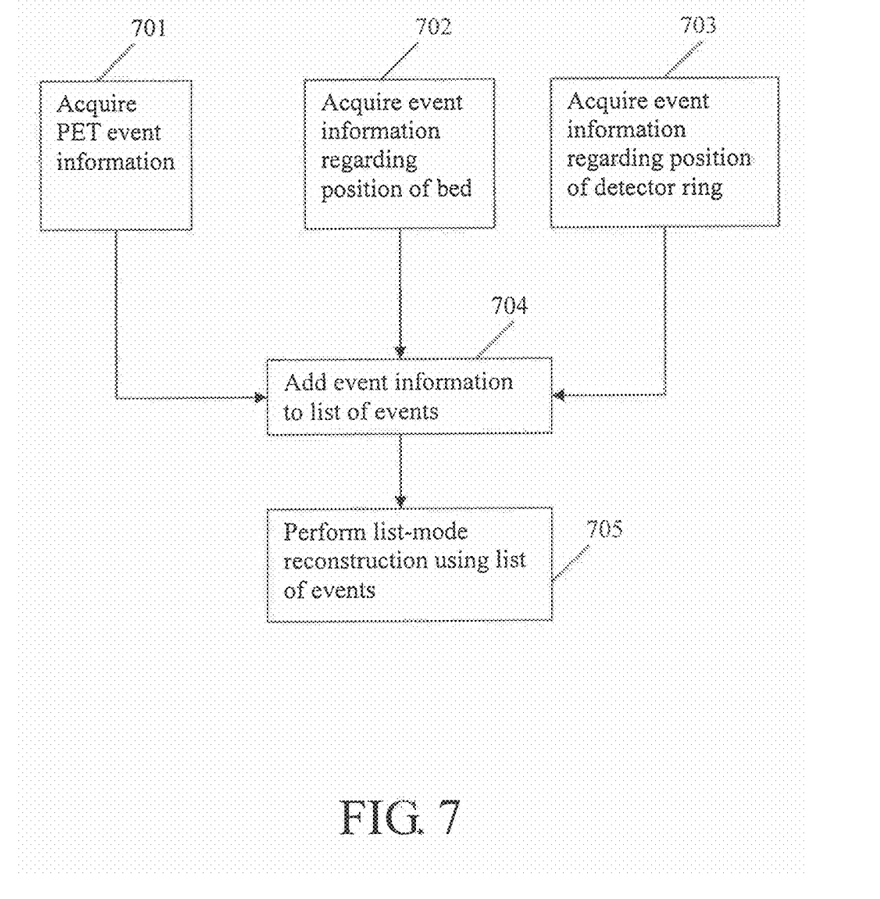
FIG. 7 is a flowchart of a method according to the present invention.

FIG. 7 is a flowchart of a method according to an embodiment of the present invention. In FIG. 7, steps 701-703 are performed continuously and simultaneously. In step 701 PET annihilation events are detected by the detector modules in the detector ring. In step 701, an event will include, for example, the time, location, and energy of the event. In step 702, event information related to the position of the patient bed is detected. For example, a change in the position of the bed is a non-detector event that is acquired in step 702. Similarly, in step 703, event information related to the position of the detector ring is detected. For example, a change in the position of the detector either axially or trans-axially is a non-detector event that is acquired in step 703. In step 704, the acquired PET detector events, the acquired bed position events, and the acquired detector position events are added to a list/buffer as they occur. It will be appreciated that the PET detector events and non-detector events will occur at different frequencies and will be added to the list accordingly. In step 705, list mode reconstruction is performed to reconstruct an image based on the event information contained in the list.

Figure 8:
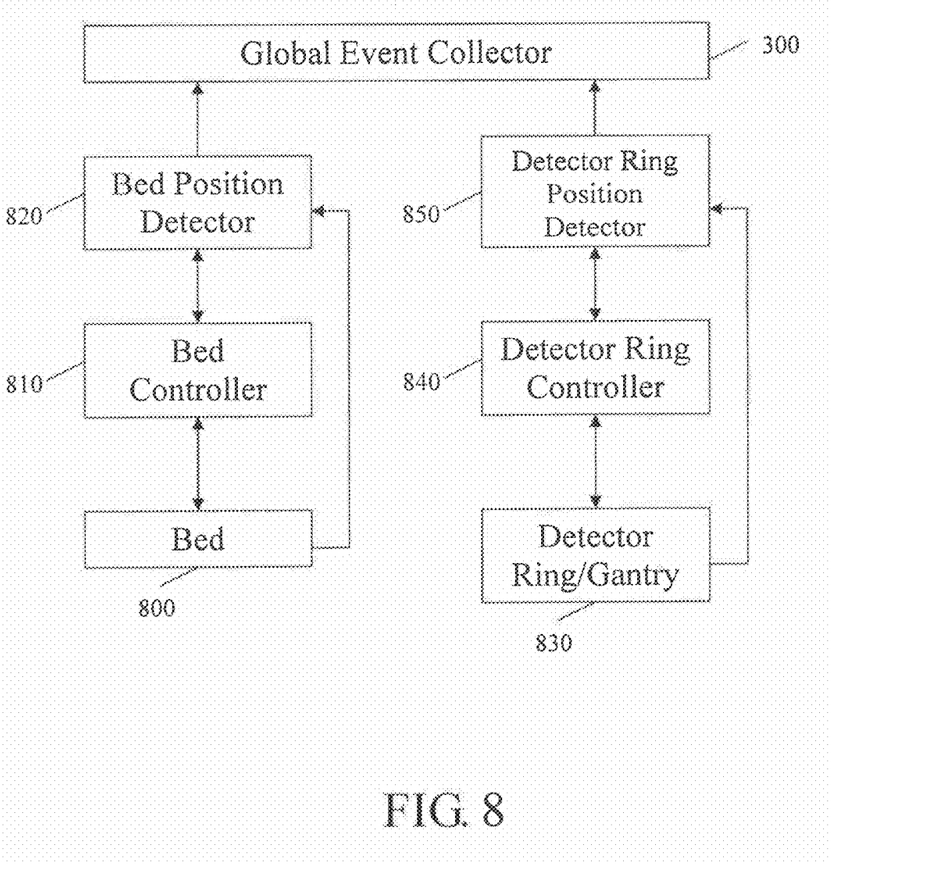
FIG. 8 is a system diagram illustrating the collection of non-detector events.

FIG. 8 illustrates a portion of the PET system in which non-detector events, including the position of the bed and the position of the detector ring/gantry, are detected and sent to the global event collector 300 shown in FIG. 3. See also FIG. 9. As shown in FIG. 8, the position of a patient bed 800 is controlled by a bed controller 810. The bed controller controls the bed based on a scan trajectory that can be set by an operator. Similarly, the position and/or rotation of the detector ring/gantry 830 is controlled by the detector ring controller 840. The detector ring controller controls the detector ring based on a scan trajectory that can be set by an operator. In an alternative embodiment the bed controller and the scan controller can be integrated into a single control unit that controls both the patient bed and the detector ring based on predetermined or operator-selected scan trajectories. The bed controller 810 and the detector ring controller 840 can be implemented in hardware or in a hardware/software combination.

The bed position detector 820 periodically detects the position and/or velocity of the patient bed 800 and sends the detected position to the global event collector 300 as a non-detector event. The bed position detector includes various sensors for detecting movement of the patient bed 800. Similarly, the detector ring position detector 850 periodically detects the position and/or angular velocity of the detector ring 830 and sends the detected position to the global event collector 300 as a non-detector event. The detector ring position detector includes various sensors for detecting movement of the detector ring 830.

The main advantages of embodiments of the present invention are to obtain a better spatial resolution using no additional hardware, and/or similar resolution with fewer detector elements. Merging of the detector and non-detector information into one flow, and the use of list-mode reconstruction allows for pure monitoring of the various positions implemented, as opposed to the necessary tight control when fixed samples are acquired in view of forming an additional variable for histogramming.

Various components of the PET system described above, including the global event collector, the data collect servers, and the pairing servers can be implemented using a computer system or programmable logic. A computer system upon which various components of the present invention may be implemented includes a bus or other communication mechanism for communicating information, and a processor coupled with the bus for processing the information. The computer system also includes a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system further includes a read only memory (ROM) or other static storage device (e.g., programmable ROM (PROM), erasable PROM (EPROM), and electrically erasable PROM (EEPROM)) coupled to the bus for storing static information and instructions for the processor.

The computer system also includes a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor for execution. A computer readable medium may take many forms, including but not limited to, non-volatile media, and volatile media. Non-volatile media includes, for example, optical, magnetic disks, and magneto-optical disks, such as the hard disk or the removable media drive. Volatile media includes dynamic memory, such as the main memory.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system may receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on a storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). The signals through the various networks and the signals on the network link and through the communication interface, which carry the digital data to and from the computer system, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system can transmit and receive data, including program code, through the networks, the network link and the communication interface. Moreover, the network link may provide a connection through a LAN to a mobile device such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

The invention claimed is:

1. A positron emission tomography (PET) scanner system, comprising:
    a detector to acquire PET event information, the detector being configured to move during acquisition of the PET event information, wherein the acquired PET event information includes information of every unpaired, single event detected by the detector;
    a first motion unit configured to acquire first event information of a position of a patient bed, the patient bed being configured to move during acquisition of the PET event information;
    a second motion unit configured to acquire second event information of a position of the detector;
    an event collector configured to generate, prior to performing coincidence pairing, an event list of events that includes, in one list, the PET event information acquired by the detector, the first event information acquired by the first motion unit, and the second event information acquired by the second motion unit; and
    a list-mode reconstructing unit configured to perform coincidence pairing by processing the PET event information included in the generated event list and to reconstruct an image by processing the generated event list.

2. The system of claim 1, wherein the event collector is configured to generate a time stamp for each of the events in the event list and to generate the event list in chronological order of the events based on the time stamps.

3. The system of claim 1, wherein the detector acquires the PET information in list mode, the list mode including time-of-flight information.

4. The system of claim 1, wherein the patient bed is configured to move linearly.

5. The system of claim 1, wherein the detector rotates around the isocenter of the PET scanner.

6. The system of claim 1, wherein the detector rotates around an arbitrary point of the PET scanner.

7. The system of claim 1, wherein the detector translates along a curve in a transaxial plane of the PET scanner.

8. The system of claim 1, wherein the detector remains stationary during acquisition of the PET information, and a motion of the patient bed is a curve in three-dimensional space.

9. A method of reconstructing an image in a positron emission tomography (PET) scanner system that includes a detector and a patient bed, both being configured to move during acquisition of PET information, the method comprising:
    acquiring, by the detector, PET event information, wherein the acquired PET event information includes information of every unpaired, single event detected by the detector;
    acquiring first event information of a position of a patient bed corresponding to the acquired PET event information;
    acquiring second event information of a position of a detector corresponding to the acquired PET event information;
    generating, prior to performing coincidence pairing, an event list of events that includes, in one list, the PET event information acquired by the detector, the acquired first event information, and the acquired second event information; and
    list-mode reconstructing an image by processing the generated event list, the list-mode reconstruction step including performing coincidence pairing by processing the PET event information included in the generated event list.

10. The method of claim 9, wherein the generating step comprises generating a time stamp for each of the events in the event list and generating the event list in chronological order of the events based on the time stamp.

11. The method of claim 9, wherein the step of acquiring PET event information comprises acquiring the PET event information in list mode, the list mode including time-of-flight information.

12. The method of claim 9, wherein the step of acquiring PET event information comprises moving the patient bed linearly during acquisition of the PET event information.

13. The method of claim 9, wherein the step of acquiring PET event information comprises rotating the detector around the isocenter of the PET scanner during acquisition of the PET event information.

14. The method of claim 9, wherein the step of acquiring PET event information comprises rotating the detector around an arbitrary point of the PET scanner during acquisition of the PET event information.

15. The method of claim 9, wherein the step of acquiring PET event information comprises moving the detector along a curve in a transaxial plane of the PET scanner during acquisition of the PET event information.

16. The method of claim 9, wherein the step of acquiring PET event information comprises:
    holding the detector stationary during acquisition of the PET event information; and
    moving the patient bed on a curve in three-dimensional space during acquisition of the PET event information.

17. A positron emission tomography (PET) scanner system, comprising:
    an acquisition unit configured to acquire PET event information, wherein the acquired PET event information includes information of every unpaired, single event detected by a detector;
    a first motion unit configured to acquire first event information of a position of a patient bed, the first event information corresponding to the acquired PET event information;
    a second motion unit configured to acquire second event information of a position of a detector, the second event information corresponding to the acquired PET event information;
    an event collector configured to generate, prior to performing coincidence pairing, an event list of events that includes, in one list, the PET event information acquired by the acquisition unit, the first event information acquired by the first motion unit, and the second event information acquired by the second motion unit; and
    a list-mode reconstructing unit configured to perform coincidence pairing by processing the PET event information included in the generated event list and to reconstruct an image by processing the generated event list.

* * * * *